(12) United States Patent
Kamada et al.

(10) Patent No.: US 7,467,099 B2
(45) Date of Patent: Dec. 16, 2008

(54) INFORMATION HOME ELECTRIC APPLIANCE

(75) Inventors: Tomihisa Kamada, Tokyo (JP); Shun Tanaka, Tokyo (JP); Ryusuke Narukawa, Tokyo (JP)

(73) Assignees: Access Co., Ltd., Tokyo (JP); Mitsubishi UFJ NICOS Co., Ltd., Tokyo (JP)

( * ) Notice: Subject to any disclaimer, the term of this patent is extended or adjusted under 35 U.S.C. 154(b) by 467 days.

(21) Appl. No.: 10/181,132

(22) PCT Filed: Jan. 15, 2001

(86) PCT No.: PCT/JP01/00184

§ 371 (c)(1),
(2), (4) Date: May 7, 2003

(87) PCT Pub. No.: WO01/52134

PCT Pub. Date: Jul. 19, 2001

(65) Prior Publication Data

US 2004/0015406 A1    Jan. 22, 2004

(30) Foreign Application Priority Data

Jan. 13, 2000    (JP)    ............................. 2000-004169

(51) Int. Cl.
*G06Q 30/00* (2006.01)
(52) U.S. Cl. ....................................................... 705/26
(58) Field of Classification Search .............. 705/26–27
See application file for complete search history.

(56) References Cited

U.S. PATENT DOCUMENTS 5,590,197 A * 12/1996 Chen et al. .................... 705/65

5,982,891 A * 11/1999 Ginter et al. .................. 705/54

FOREIGN PATENT DOCUMENTS

EP    883 313    12/1998

(Continued)

OTHER PUBLICATIONS

Corcoran, Peter M., Desbonnet, Joe; "Browser-Style Interfaces to a Home Automation Network", IEEE, 1997.*

(Continued)

*Primary Examiner*—Jeffrey A. Smith
*Assistant Examiner*—Kalyan Deshpande
(74) *Attorney, Agent, or Firm*—patenttm.us

(57)    ABSTRACT

By performing initial user registration via an SSL-compliant browser in an information home electric appliance 100, user's private key, digital certificate, and member information are downloaded (b2) into the storage device in the information home electric appliance. At card use time, when the user selects products on a merchant's SSL-compliant server and issues a purchase instruction (c1), the user is identified locally in the information home electric appliance based on a personal identification number. Subsequently, the information home electric appliance accesses an SSL-compliant settlement server 220 (C4) and sends a digital certificate and member information stored in the appliance. Then, mutual authentication is performed between the user and the settlement server and, based on the member information, an authorization gateway 241 authorizes the account settlement (c5). This allows even an information home electric appliance with a relatively small capacity memory device to conduct relatively secure transactions over the Internet using a credit card.

5 Claims, 8 Drawing Sheets

FOREIGN PATENT DOCUMENTS

| JP | 11-27290 | 1/1999 |
|----|----------|--------|
| JP | 11-167591 | 6/1999 |
| JP | 11-203358 | 7/1999 |
| JP | 11-345201 | 12/1999 |
| WO | 97/49055 | 12/1997 |
| WO | 99/24892 | 5/1999 |

OTHER PUBLICATIONS

"Nihon Hatsu no SET Taiou Denshi Shoutengai V-Mall wo ou", ASCII NT, vol. 1, No. 10 (Japan) Kabushiki Kaisha Asuki, Oct. 1998, pp. 134-137.

Sherif, M. H. et al., "SET and SSL: Electonic payments on the Internet.", Proc. Third IEEE Symposium on Computers & Communications (ISCC '98), Jun. 1998, pp. 353-358.

Sha, Willie et al., EC/Denshi-Kessai System ni okeru Security no Kangaekata (How to consider security in EC/Electyronic Payment System), Toshiba Review, vol. 54, No. 7, Jul. 1999, pp. 45-48.

"SET & SSL: electronic payments on the internet", Computers and Communications, 1998. ISSC '98. Proceedings. Third IEEE Symposium on, Athens, Greece, Jun. 30-Jul. 3, 1998, pp. 353-358.

Jormalainen S and Laine J: "Security in the WTLS". Computer Science and Engineering Helsinki University of Technology Nov. 3, 1999. Abstract.

Sherif M H et al: "SET and SSL: electronic payments on the Internet" Computers and Communications, 1998. ISCC '98. Proceedings. Third IEEE Symposium on Athens, Greece Jun. 30-Jul. 2, 1998, Los Alamitos, CA, USA,IEEE Comput. Soc, US, Jun. 30, 1998, pp. 353-358, XPOI0295142 ISBN: 0-8186-8538-7, abstract, 1. Introduction. 5. A hybrid SET/SSL architecture, figures 4, 5.

Jormalainen S and Laine.J: "Security in the WTLS" Computer Science and Engineering Helsinki University of Technology, Nov. 3, 1999, XP002167503 abstract.

* cited by examiner

INFORMATION HOME ELECTRIC APPLIANCE

The present invention relates to an information terminal device, and more particularly to an information home electric appliance, such as a cellular phone suitable, for settlement (payment) by an electronic credit card account for products, which are purchased with a credit card at virtual stores on a communication medium, using the information home electric appliance.

BACKGROUND ART

Recently, the Internet has rapidly become popular even at home with electronic commerce being carried on over the Internet. For example, SET (Secure Electronic Transaction) is known as a protocol for making a card account settlement over the Internet. A card member (cardholder) installs a SET-dedicated application, called Wallet, into his or her own personal computer (PC), while a merchant that opens a virtual store installs a SET-dedicated application into the web server. The user browses the web pages of the sites of virtual stores with a browser, which is provided for browsing the World-Wide Web (WWW), to select a product the user wants to purchase. This purchase instruction starts the Wallet on the personal computer to make a card account settlement with the settlement gateway (payment gateway). After that, the product is sent from the merchant to the user.

For the details on the SET, see "USING SET for Secure Electronic Commerce" written by Grady N. Drew and translated by Takeaki Ota, Pearson Education Co.

On the other hand, while a personal computer has been used conventionally as a primary tool for accessing the Internet, a non-PC apparatus, such as a cellular phone (including a PHS: Personal Handy phone System), television set, video game machine, word processor, and car navigator are used now for this purpose (For sake of convenience, those information terminals are called information home electric appliances in this specification). Therefore, it is desired that electronic commerce be carried on easily and securely even on those information home electric appliances.

However, because user's ability to directly access data (files) stored in an internal storage device (for example, a hard disk device) of a standard personal computer requires some special measures and, because a special security protocol is used, a SET-dedicated application must be large in size. For this reason, on an information home electric appliance, especially a cellular phone on which a large-capacity memory device cannot be included, there is a limit on the size of an installable application (program) and therefore it is difficult to install the application described above.

In view of the foregoing, it is an object of the present invention to allow even an information home electric appliance with only a relatively small capacity storage device to conduct relatively secure transactions on the Internet with a credit card.

DISCLOSURE OF THE INVENTION

Some WWW (World Wide Web) browsers comply with an encryption protocol, such as SSL (Secure Socket Layer), to securely communicate with a communication partner. The SSL is described, for example, in "Full Description of Web Server Technology" written by Nancy J. Yeager, Robert E. McGrath and translated by Yoshiko Enomoto, Nikkei BP, pp. 367-371. The present inventors have extended an existing browser, which is compliant with the encryption communication protocol, to provide a browser which is relatively small but supports electronic commerce, and an information home electric appliance that uses the browser. The browser, including a part corresponding to a SET application, may be installed even in an information home electric appliance.

Communication security (a message not being decoded even if intercepted or there being neither pretender nor message alterations) is vital to electronic commerce on the Internet. The present invention is now able to reduce the program installation size of the whole browser, including a part corresponding to a SET application, to at least 1/10 of the SET application by using an encryption protocol included in the browser, such as SSL, as programs for encryption, authentication, etc.

Conveniently enough, unlike a personal computer, an information home electric appliance does not provide the user with a function to directly access data or files in the internal storage device, making it difficult to illegally obtain or alter internal data. Therefore, special measures, which would be required in a personal computer, need not be taken.

An information home electric appliance according to the present invention is an information home electric appliance for use in an electronic account settlement of products purchased via a credit card at a virtual store on a communication medium, the information home electric appliance having an Internet accessing capability, comprising:

storing means for storing a browser for browsing documents described in a markup language, the browser being compliant with an encryption communication protocol; and input means for causing a user to input characters, wherein the browser comprises:

for use in initial user registration for shopping at a virtual store by a card member who is a user of the information home electric appliance, a first function that allows the information home electric appliance to communicate with a card issuer's server, which is compliant with the encryption communication protocol, in response to an instruction from the user to input to the server a card number, personal information for identifying the card member, and password information for electronic account settlement decided by the card member;

a second function that receives, from the card issuer's server, information for authenticating the card member in accordance with the encryption communication protocol and personal information on the card member and stores the received information into a storage device in the information home electric appliance;

and, for use in purchasing products at the virtual store, a third function that allows the information home electric appliance to communicate with a site of the virtual store in response to an instruction from the user;

a fourth function that requests the user to input the password information for electronic account settlement and compares the entered password information with password information stored in the appliance to confirm that the user is the card member who requested the initial user registration via the information home electric appliance;

a fifth function that sends order information to a server of the virtual store in response to an instruction from the user;

a sixth function that accesses a settlement server of the card issuer via the Internet in response to an instruction from the server of the virtual store that received the order information; and a seventh function that authenticates the card member with the settlement server using the information for authenticating the card member and then sends the personal information stored in the storage device to the settlement server.

The present invention described above allows a relatively secure transaction to be made via a credit card on a communication medium even with an information home electric appliance with a relatively small capacity storage device.

During initial user registration for shopping at virtual stores by a card member who is the user of the information home electric appliance, the browser described above may have a function to cause the user to input password information for the card member assigned by the host computer of the card issuer instead of the function to causing the user to input password information for electronic account settlement decided by the user.

Personal information on a card member received by the information home electric appliance from the server of the card issuer at least includes a card number and a card expiration date. This card number need not be the card number entered by the user during initial registration but may be a new card number issued by the card issuer.

The browser may have a function to receive secret information from the server of the card issuer during the initial user registration and a function to receive the secret information and the password information in response to an instruction from the server before receiving information for authenticating the card member in accordance with the encryption communication protocol and personal information on the card member from the server of the card issuer.

The browser may have an eighth function that downloads, via a communication medium, a computer program for executing the first to seventh functions instead of initially having the first to seventh functions.

In addition, the present invention may be implemented as a computer program that performs the functions described above and as its recording medium.

BEST MODE FOR CARRYING OUT THE INVENTION

A preferred embodiment according to the present invention will be described in detail below with reference to the attached drawings.

Figure 1:
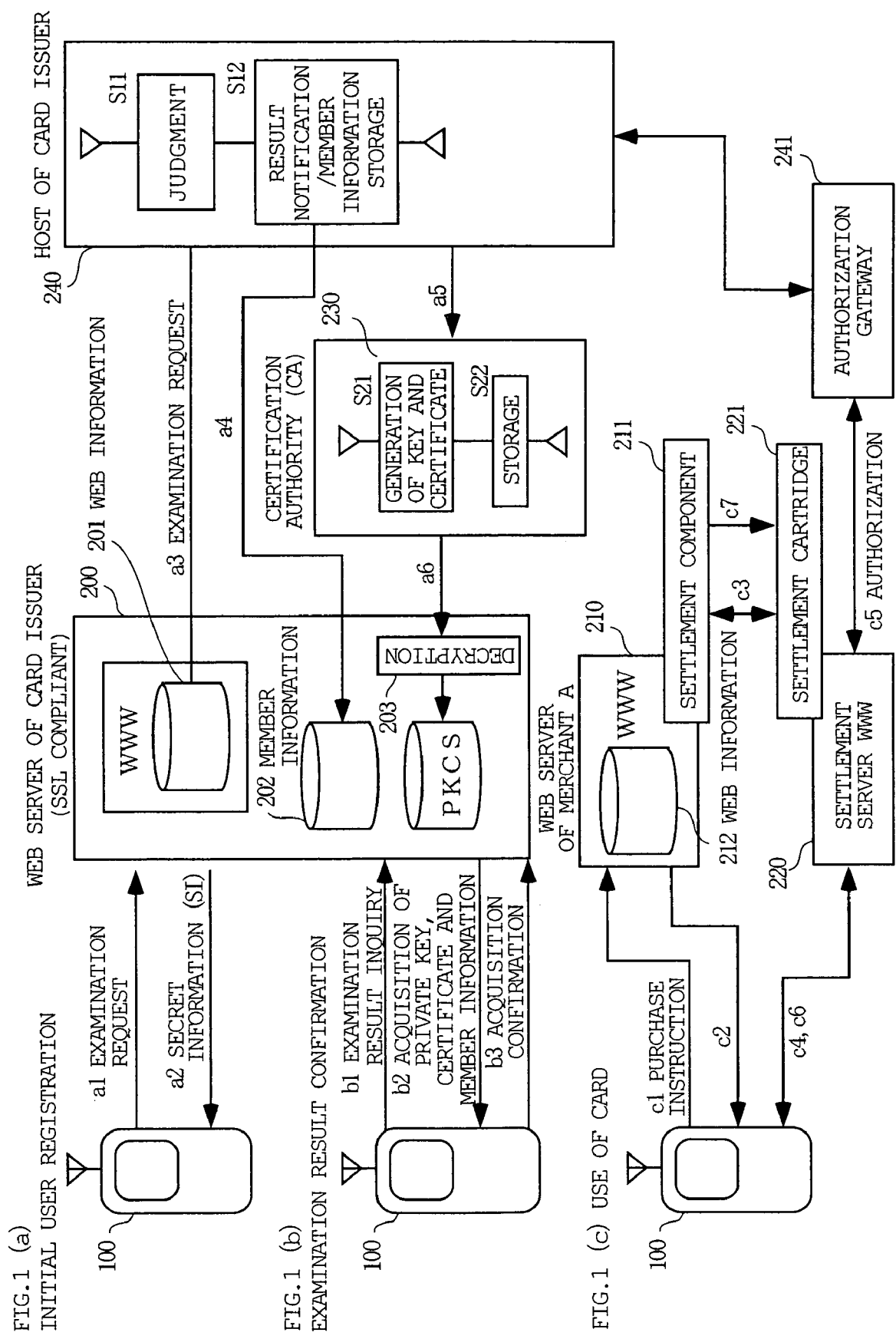
FIG. 1 is a block diagram showing the general configuration of an electronic credit card account settlement system according to the present invention and the flow of information among the components.

FIG. 1 is a block diagram showing the general configuration of an electronic credit card account settlement system according to the present invention and the flow of information among the components of the configuration. In this example, three stages are shown as the system use stages. That is, the first stage is an "(a) Initial user registration" stage in which a user, who is already a card member, must perform only once in the beginning for making an electronic credit card account settlement (hereafter simply referred to as a card settlement or an electronic settlement). The second stage is an "(b) Examination result confirmation" stage performed by the user following the initial registration. The user also performs this second stage only once in the beginning. The third stage is a "(c) Card use (product purchase) stage" in which the user actually purchases products at virtual stores of merchants. This stage can be repeated. As will be described later, the second stage (b) may be regarded as a part of the first stage (a) Initial user registration.

In this embodiment, the user is assumed to use a cellular phone, which is used as an information home electric appliance with a capability to access the Internet, as an electronic settlement terminal. This cellular phone has the Internet accessing capability, and its web browser supports SSL (for example, 128 bits). However, note that the terminal used in the present invention is not limited to a cellular phone but that an information home electric appliance, such as a television set (including a so-called set-top box), a video game machine, a word processor, and a car navigator, may be used.

The following describes the contents of each stage in detail. In each stage, data communicated over the Internet is preferably encrypted using the SSL.

(a) Initial User Registration

In this stage, a card issuer examines the user if he or she is allowed to make an electronic settlement. In this embodiment, this initial user registration is performed for a card member who has already acquired a credit card from the card issuer. However, immediately before the initial user registration, a non-card-member user may perform the member enrollment procedure.

In response to an instruction from the user, a cellular phone 100 accesses a web server 200 (for example, the URL https://www.xxx-card.co.jp) of the card issuer via the Internet. This web server 200 is an SSL-compliant server that supports the SSL. The server 200, with a storage unit 201 containing web information (a form composed of text, image, and a combination of them) described in a markup language such as HTML, XML or the like sends the web information to the user's cellular phone 100 when the web site is accessed. In response to this web information, an SSL-compliant browser installed in the user's cellular phone 100 interprets the web information and displays it on the screen. During the initial user registration for an electronic card settlement, the user receives a form, in which the user must fill in the required information, from the web server 200. This form has columns for specifying various types of user's personal information (member information) and a Personal Identification Number (PIN) decided by the user. This personal identification number is stored in the internal nonvolatile storage device (flash memory in this example). This personal identification number identifies the user and, other than such a personal identification number, any information such as a fingerprint, iris, or voiceprint, may be used as long as it identifies the user. In the present invention, information for identifying the user, including a personal identification number, is generally called password information. The cellular phone 100 sends the filled-in form, as well as an examination request, to the web server 200 (a1). The information that is sent is encrypted by a known SSL-based method before being sent. An example of personal information that is entered when an examination request is entered will be described later. In response to this information, the web server 200 sends Secret Information (SI) back to the cellular phone 100 (a2).

The web server 200 transfers the examination request to a host computer (hereinafter simply called a host) 240 of the card issuer, for example, via the LAN (a3). In response to this request, the host 240 makes a judgment based on a predetermined condition (S11) and sends the judgment result back to the web server 200 (S12, a4). The judgment result includes not only the information indicating the acceptance/rejection of user's electronic settlement but also, for a user who is accepted, the member information on the user. This member information is stored in a storage unit 202 in the web server 200. Although this member information corresponds to the personal information entered by the user in step a1 before, the details and the format are not always the same.

The host computer 240 also requests a predetermined Certification Authority (CA) 230 to issue the digital certificate of the user that will be used for user authentication (client authentication) and encryption (a5). The certification authority 230 generates a pair of keys (public key and private key) used in the public key cryptosystem, as well as the digital certificate of the public key, for the user (S21). The digital certificate for the user is generated by the certification authority 230 that digitally signs a message, which contains the user name (or identifier) and the public key of the user, to guarantee the authenticity of the key. RSA is known as an example of the public key cryptosystem. The certification authority 230 sends the private key and the digital certificate, which have been encrypted (for example, RSA PKCS#12 format), to the web server 200 of the card issuer via a predetermined route (S22, a6). The web server 200 decrypts them and stores them in a storage unit 203 (that may be the same as the storage unit 202 described above). This decryption is done assuming that the user's information home electric appliance has no decryption function when the information is sent to the user later. If the information home electric appliance has such a function, the web server 200 need not perform this decryption.

(b) Examination Result Confirmation

In this stage, the user who issued an examination request accesses the web server 200 again at a later date via the Internet to know the examination result. That is, in response to a user's instruction, the cellular phone 100 sends an examination result inquiry request (b1). Upon receiving this request, the web server 200 requests the user to input the secret information (SI) received from the web server 200 at the examination request time and the personal identification number (PIN) entered by the user at the examination request time. Based on this personal identification number, the web server 200 checks if the user who made the examination result confirmation request is the person identical to the user who made the examination request and identifies the examination request based on the secret information.

The web server 200 that has received the examination result inquiry sends the examination result back to the user (b2). If the examination result is "OK", the cellular phone 100 is allowed to download the member information of the user stored in the storage unit 202 and the private key, digital certificate, and member information stored in the storage unit 203 (b2). The downloaded information may be recognized as an electronic credit card. The cellular phone 100 stores the downloaded information in its own storage device (for example, a flash memory 107 that will be described later) in a predetermined format. The user of the cellular phone 100 is not given means for directly accessing or rewriting the stored information. The cellular phone 100 sends a confirmation message to the web server 200 indicating that the information has been correctly stored (b3). The cellular phone 100 may store the downloaded information in the encrypted form, in the storage device. In response, the web server 200 deletes the member information from the server for security.

(C) Use of a Card (Product Purchase)

After stage (b), the user is able to visit the virtual store site of any merchant on the Internet, place an order for a product or the like, and make the electronic settlement of the purchase using the card. For example, when the cellular phone 100 (browser) accesses the site of merchant A in response to the user's instruction, an SSL-compliant web server 210 of merchant A sends the web information (home page information) from a storage unit 212, in which web information for purchasing products is stored, to the cellular phone 100. The browser of the cellular phone 100 displays its contents on the screen. The user selects from the screen a product to be purchased and issues an order instruction (c1). In response to this instruction, the web server 210 of merchant A adds an order number to each order and sends data, such as the merchant ID and purchase amount, as well as an order acceptance message to the cellular phone 100 as the product purchase slip (c2). Instead of, or in addition to, this message, the confirmation mail (electronic mail) of the order may be sent to the cellular phone 100 of the user. The product purchase slip including the order number is sent to an SSL-compliant settlement server 220 over the Internet in step c4 later.

A settlement component 211 attached to the web server 210 of merchant A performs SSL-based mutual authentication with a settlement cartridge 221 attached to the settlement server 220 provided by the card issuer over the Internet and, after that, the settlement cartridge 221 obtains the order information (c3) described above. However, because the order information is sent also from the cellular phone 100, the order information need not always be sent from the web server 210 of merchant A to the settlement server 220. The settlement component is a software component for making a settlement on the web server 210, while the settlement cartridge is a software component for making a settlement on the settlement server 220. There is a difference in the names of those software components for reference convenience only; there is no other special meaning. Mutual authentication refers to the authentication performed by two communication parties to authenticate that the other party is genuine. In this case, the web server 210 of merchant A authenticates that the settlement server 220 is a genuine settlement server and, at the same time, the settlement server 220 authenticates that the web server 210 is the genuine web server of merchant A. Therefore, both merchant A and the settlement server 220 must have obtained their own digital certificates from the predetermined certification authority in advance.

In addition, the cellular phone 100 accesses the settlement server 220 either automatically (for example, according to the confirmation mail or to the instruction in the settlement server's link (URL) included in the product purchase slip) or in response to an instruction from the user. If, after SSL mutual authentication, the authentication result is good, the cellular phone encrypts the pre-stored member information and the product purchase slip information and sends them to the settlement server 220 (c4). During the mutual authentication between the cellular phone 100 (client) and the settlement server 220, the server sends its own digital certificate to the client in response to access from the client and, at the same time, the client sends its own digital certificate to the server. They use the known method to confirm each other that the other party is a genuine party. Although an SSL-compliant browser has conventionally performed server authentication in most cases, the browser also performs user authentication (client authentication) in the present invention. To do so, a pair of the private key and the public key in the public key cryptosystem is given also to the user as described above, and user authentication is performed using the digital certificate, which includes the user's public key, and the private key.

If step c1 and step c4 are performed in the same session, the confirmation mail described above is not always needed.

The settlement server 220 communicates with an authorization gateway 241 of the card issuer (or directly with the host computer 240) to decide whether the user is authorized to settle the account (perform authorization) (c5). In this case, the member information, which has been sent from the cellular phone 100 to the settlement server 220 in advance, is used. For example, if the member information indicates that the credit card has expired, the settlement is rejected. The authorization checking result is reported to the cellular phone 100 (c6). Although the settlement server 220 and the authorization gateway 241 communicate each other over the Internet, they may communicate via a leased line or a LAN because the communication is a one-to-one communication.

The settlement cartridge 221 of the settlement server 220 performs SSL mutual authentication with the settlement component 211 of the merchant A over the Internet and, then, performs final sales processing (c7). During this sales processing, the merchant charges the card issuer for the product whose settlement has been authorized.

In this way, electronic settlement is done in real time. When the settlement is completed, the product is delivered from the merchant A to the user.

Although it is assumed in this embodiment that the first stage and the second stage are performed in separate communication sessions with an interval of time between them, the first stage and the second stage may be thought of as one stage if they can be performed in one communication session. In that case, the secret information acceptance step (a2) and the examination result inquiry step (b1) are not necessary.

Figure 2:
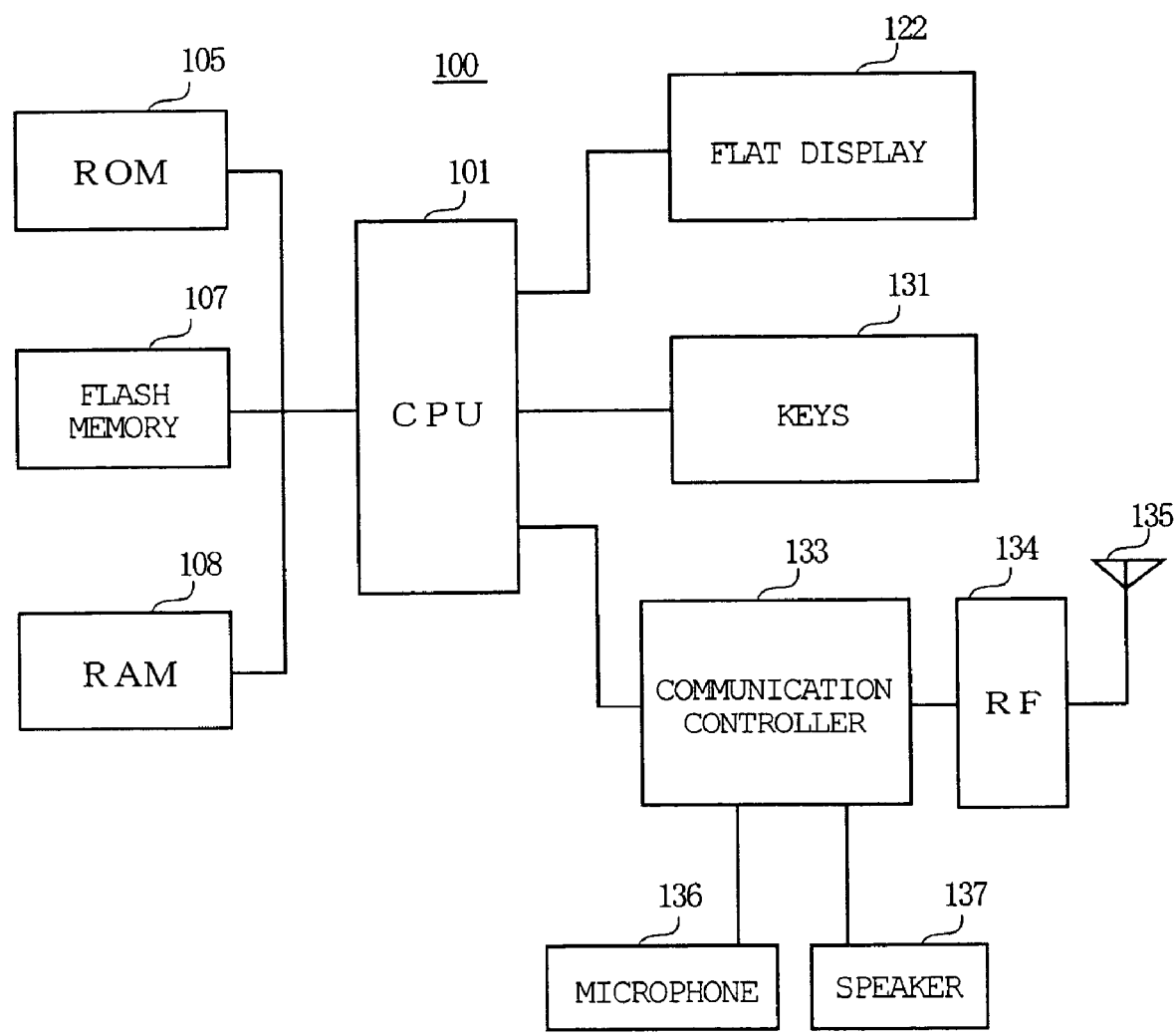
FIG. 2 is a block diagram showing an example of the general configuration of the hardware of a cellular phone in the system shown in FIG. 1.

FIG. 2 shows an example of the general hardware configuration of the cellular phone 100. In the configuration shown in FIG. 2, a central processing unit (CPU) 101 controls the cellular phone 100 in its entirety. Connected to the CPU 101 are a ROM 105, a flash memory 107, a RAM 108, a flat display 122, keys 131, and a communication controller 133.

The ROM 105 is a read-only nonvolatile memory in which computer programs to be executed by the CPU 101 and necessary data are stored. The programs include a browser whose function has been extended by the present invention.

The flash memory 107 is a re-writable nonvolatile memory in which downloaded data or programs are stored in a non-volatile basis. This memory need not be a flash memory as long as it is storage means that attain the intended object.

The RAM 108 provides temporary storage areas, work areas, and areas for storing various types of data required by the CPU 101 for program execution.

The flat display 122 is a device on which various types of information on this cellular phone are displayed for the user.

The communication controller 133 is a voice and data communication control unit connected to an antenna 135 via an RF unit 134 and connected also to a microphone 136 and a speaker 137.

The means and operation of the cellular phone according to the present invention are implemented primarily by the execution of the programs, stored in the ROM 105 (or flash memory 107), by the CPU 101.

In FIG. 1, more detailed configuration (for example, display memory, display controller, or input/output controller, and so on) is omitted.

Figure 7:
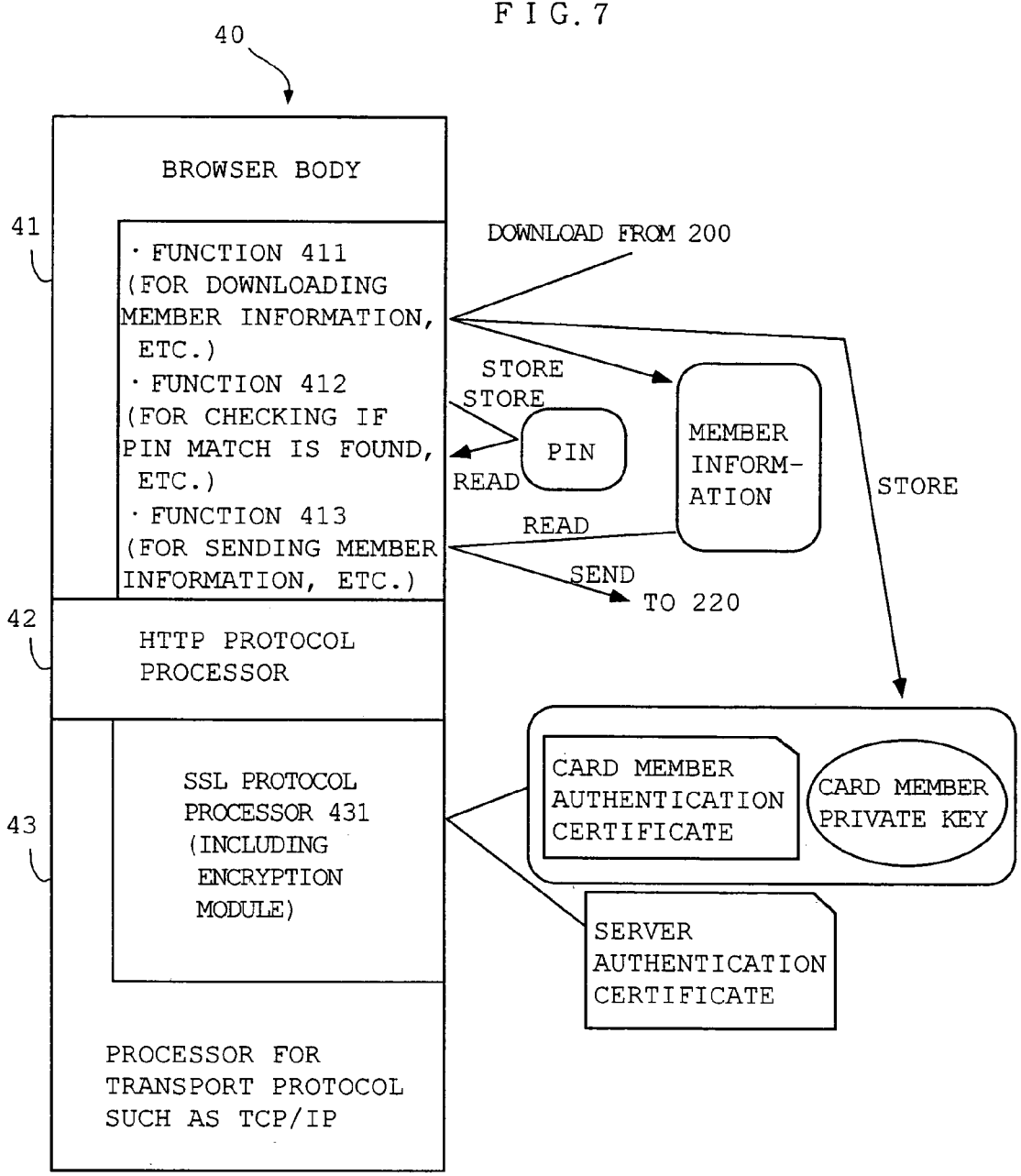
FIG. 7 is a diagram showing an example of the configuration of a web browser extended for an account settlement function in the present invention.

FIG. 7 shows an example of the configuration of a web browser 40 whose function has been extended for a settlement (payment) function. The browser 40 is pre-stored in the ROM 105 shown in FIG. 2. The upgraded part of the browser or additional functions are stored in the flash memory 107.

The browser 40 comprises a browser body 41 that browses documents coded in a markup language, an HTTP protocol processor 42 that transfers hypertext, and a transport protocol processor 43 that processes a transport protocol such as TCP/IP.

The browser body 41 has major functions 411, 412, and 413, added as the special functions for use in the present invention. The function 411 is a processing function for PIN storage in step a1 in FIG. 1 and for obtaining, storing (downloading), and reading the private key, certificate, and member information in step b2. The function 412 is a processing function for executing the preprocessing of step c1; that is, the function receives the personal identification number (PIN) and confirms that the received number matches the correct number. The function 413 is a processing function for sending the member information to the settlement server 220 in step c4.

The transport protocol processor 43, which has an SSL protocol processor 431 including an encryption module, performs SSL authentication using the server authentication certificate obtained when the card is used, the downloaded and stored card member's authentication certificate, and the private key.

In this way, by adding the functions necessary for the present invention to an existing web browser which supports the encryption communication protocol (preferably, a web browser for use on a portable terminal), the program installation size can be minimized.

Figure 8:
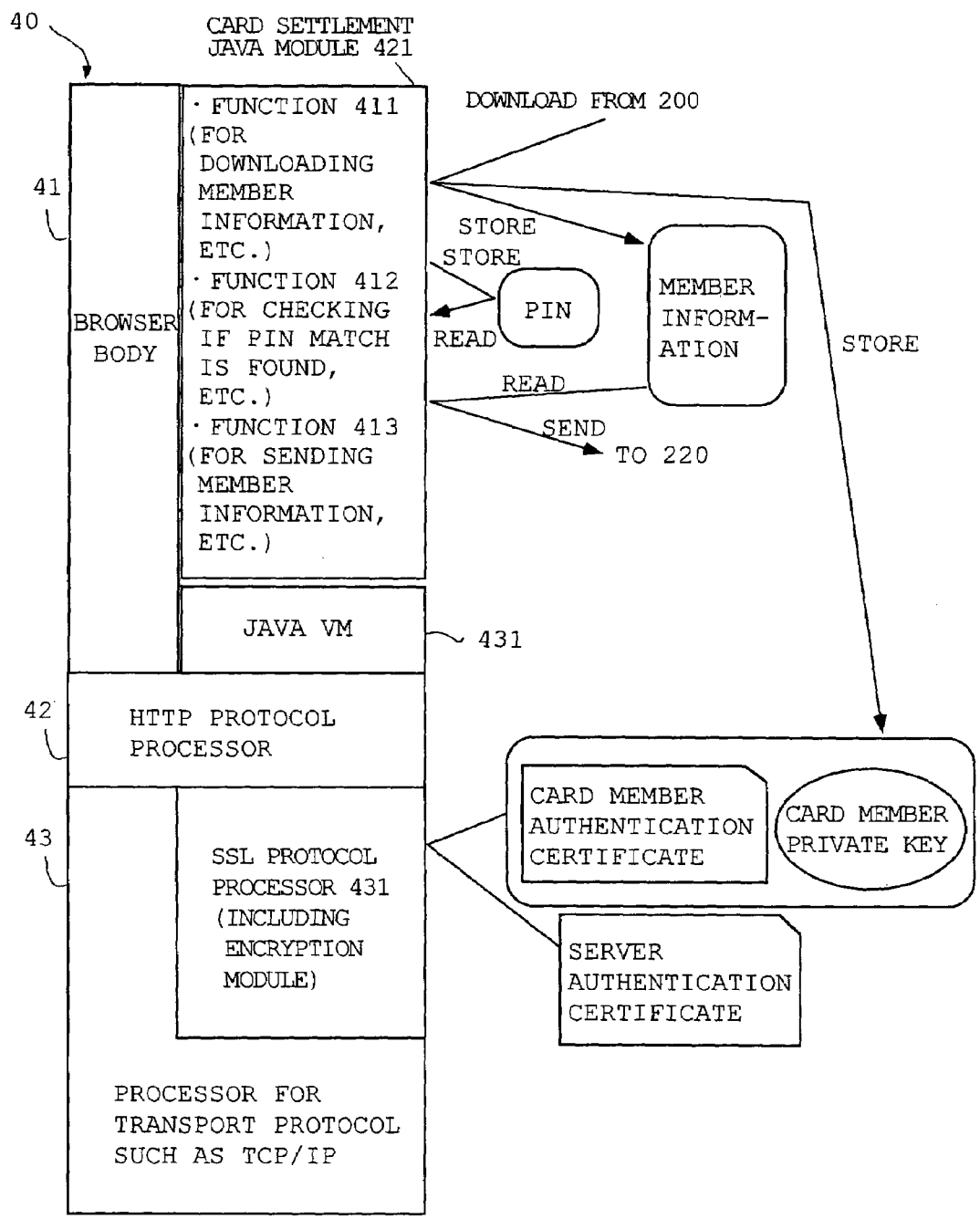
FIG. 8 is a diagram showing another example of the configuration of a web browser extended for the account settlement function in the present invention.

FIG. 8 shows another example of the configuration of the browser. In this example, instead of directly changing the browser body 41, a card settlement Java module 421, which performs a card settlement related processing module on a Java (trademark) virtual machine (VM) 431, is downloaded from a predetermined web site into the flash memory 107 before the processing of the present invention is performed. The card settlement Java module 421 performs, at a later time, the functions equivalent to those of the functions 411, 412, and 413 shown in FIG. 7. The configuration shown in FIG. 8 eliminates the need for the additional functions to be included into the body of the browser 40 in advance but allows the user to add the card settlement function as necessary.

Figure 3:
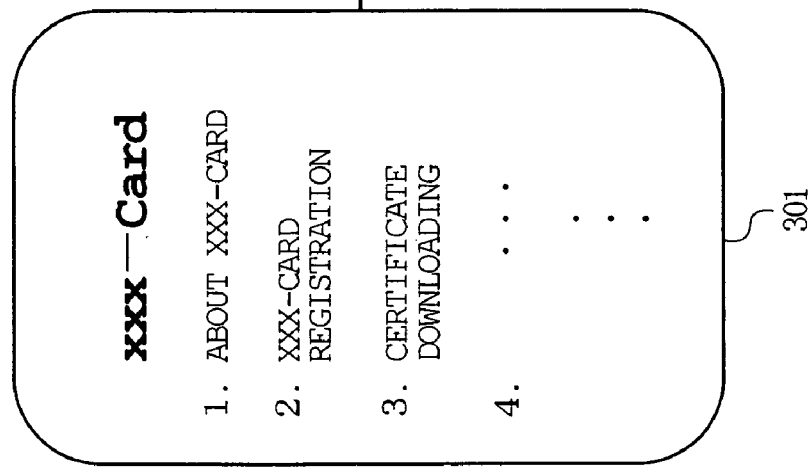
FIG. 3 is a diagram showing the input operation of a user when an examination request is made in step a1 in FIG. 1.
Figure 3:
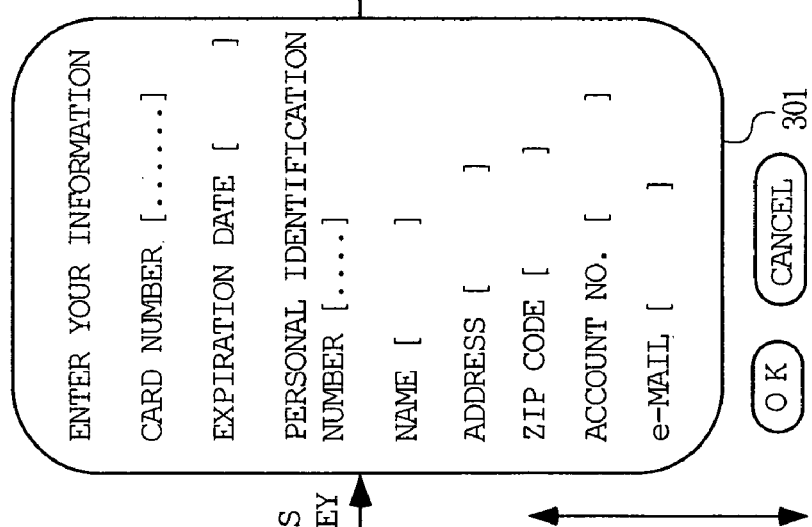
Figure 3:
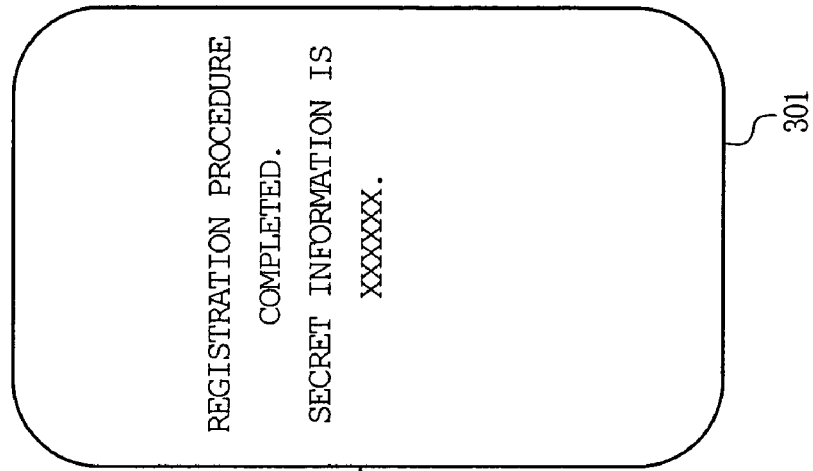

Next, referring to FIG. 3, the user input operation at an examination request time in step a1 in FIG. 1 will be described. FIGS. 3(*a*), (*b*), and (*c*) show how the screen 301 of the display 122 of the cellular phone 100 changes during this operation. FIG. 3(*a*) shows the menu screen displayed when the user accesses the home page of the card issuer. The user can press a key or select a displayed button to enter what he or she wants the cellular phone to do. A displayed button is selected by moving the focus to the button with an arrow key or the like and then pressing a special key such as a confirmation key. To make an examination request, the user selects, for example, "2. e-CARD REGISTRATION" shown in the figure. This causes the web server 200 to provide a form, such as the one shown in FIG. 3(*b*), in which user's personal information is entered. The up/down double-headed arrow in FIG. 3(*b*) indicates that, when all information cannot fit on the screen at a time, the image scrolls in the upward or downward direction automatically as the user enters information or in response to an instruction from the user. Alternatively, the screen may be designed such that the user is prompted to enter information one or more input items at a time that fit on the screen. Because the cellular phone is assumed as an information home electric appliance in this example, Kana and alphanumeric/symbolic characters are assumed as input characters. Of course, for a cellular phone that has Kanji input function, Kanji characters may be accepted. Personal information in this example includes the card number of the user's credit card, its expiration date, personal identification number (PIN), name, address, ZIP code, bank account number from which the payment through the credit card is made, and electronic mail address. The personal identification number is, for example, a user-specified numeric value with a predetermined number of digits. This personal identification number, which is used in the examination result confirmation stage and in the use stage, may be different from the password of the credit card. It is also possible that this personal identification number is decided by the card issuer after the examination request and that the decided personal identification number is sent to the user via mail or communication (for example, when step b2 is carried out).

Upon completion of the input of the personal information on the screen in FIG. 3(b), the message indicating that the registration procedure has completed, as well as the secret information (SI), is displayed as shown in FIG. 3(c). The user writes down or memorizes this number for use in the examination result confirmation time described above.

Figure 4:
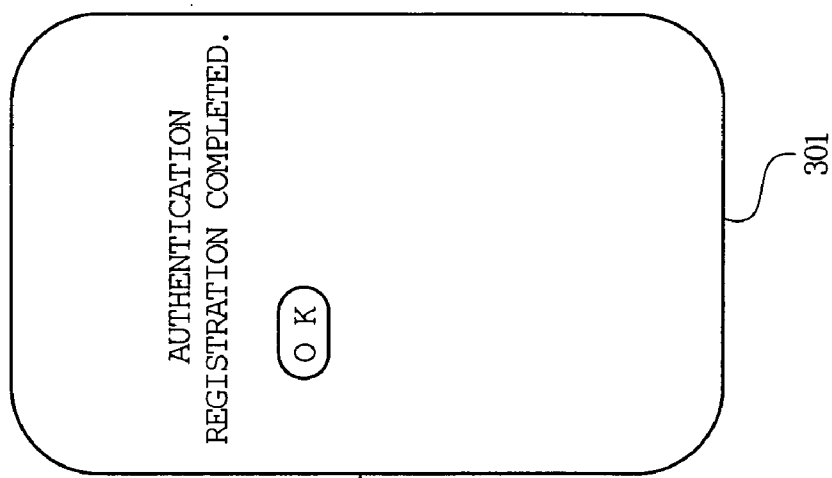
FIG. 4 is a diagram showing the input operation of a user when an examination result is confirmed in step b1 in FIG. 1.
Figure 4:
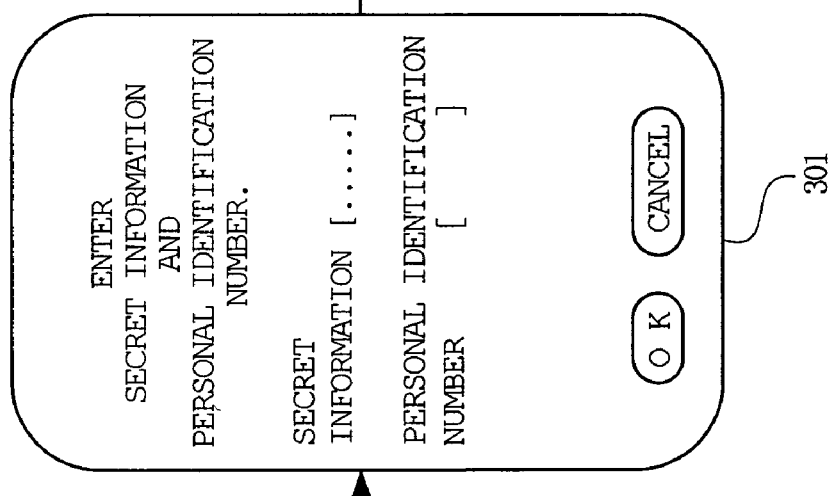
Figure 4:
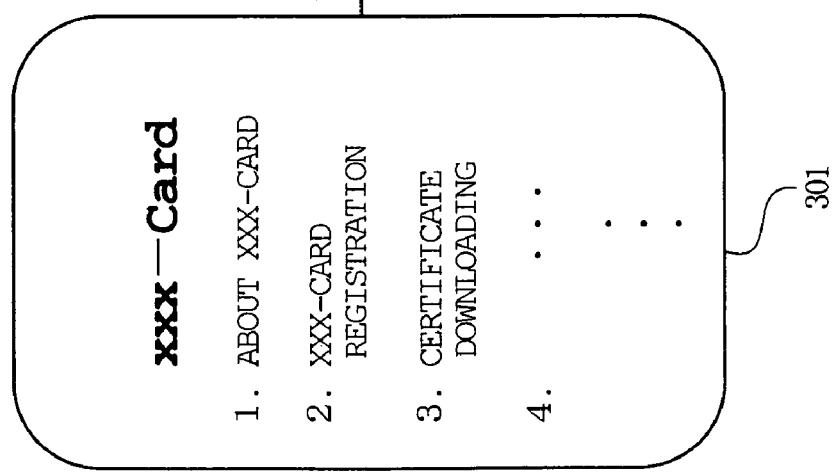

Next, referring to FIG. 4, the user input operation at the examination result confirmation time in step b1 in FIG. 1 will be described. FIGS. 4(a), (b), and (c) show how the screen 301 of the display 122 of the cellular phone 100 changes. When the user selects "3. CERTIFICATE DOWNLOADING" from the menu screen shown in FIG. 4(a), the user is prompted to enter the secret information and the personal identification number (PIN) as shown in (b) of the same figure. When both data units are entered and if they are authentic, the information such as the certificate is downloaded and, as shown in (c) of the same figure, the message indicating that authentication registration has completed is displayed.

Figure 5:
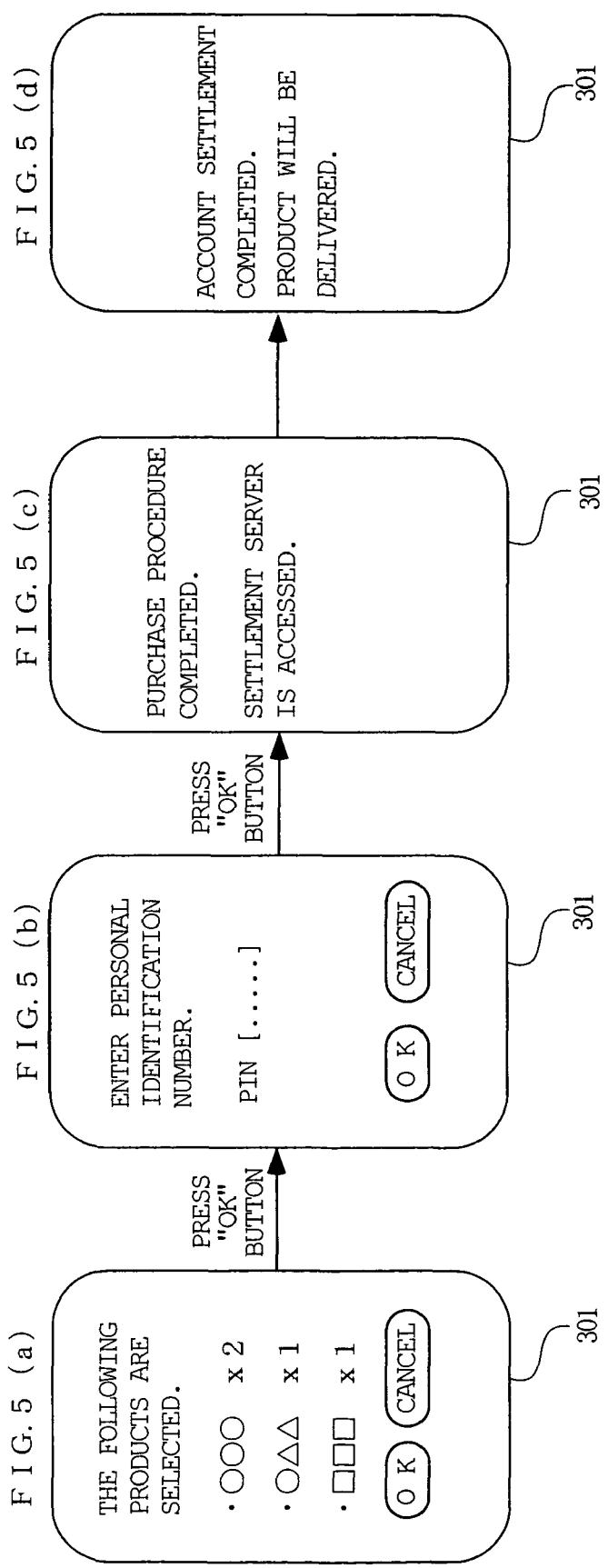
FIG. 5 is a diagram showing the input operation of a user when a card is used in FIG. 1.
Figure 6:
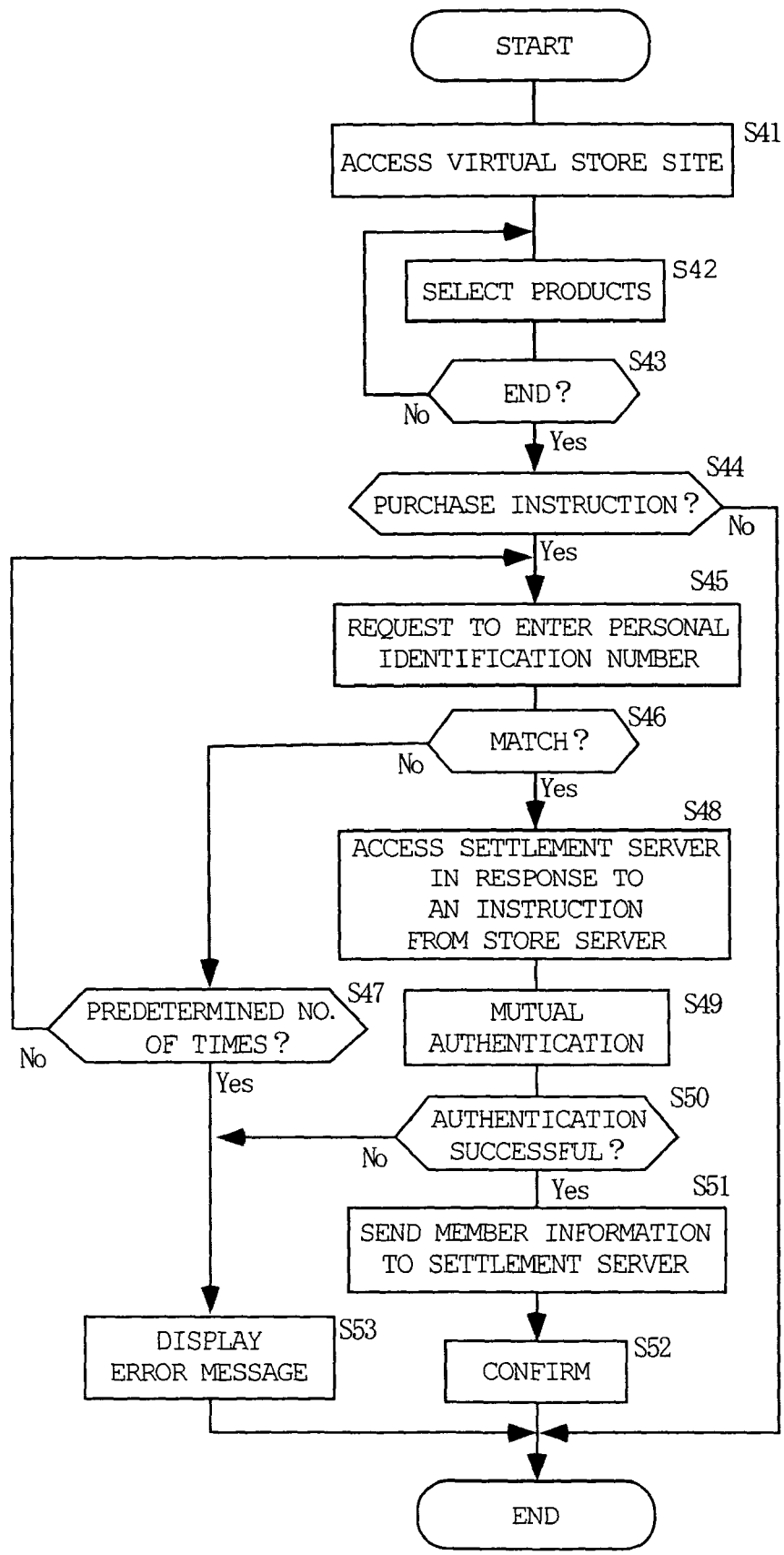
FIG. 6 is a flowchart showing the processing procedure for purchasing products via a cellular phone in the embodiment of the present invention.

Next, referring to FIG. 5, the input operation of the user at a use time (at a product purchase time) in steps c1 and c4 in FIG. 1 will be described. The flowchart in FIG. 6 is also referenced. FIGS. 5(a)-(d) show how the screen 301 of the display 122 of the cellular phone 100 changes during this operation. The screen in FIG. 5(a) shows the screen that is displayed after the user visits the virtual store site of a merchant (S41 in FIG. 6) and selects desired products on the home page (S42, S43). When the user decides to purchase the products (S44), the screen changes to the one shown in FIG. 5(b). On the screen shown in FIG. 5(b), the user is prompted to enter the personal identification number (PIN) (S45). The cellular phone 100 compares the entered personal identification number with the personal identification number already stored internally (S46) and, if they match, finds that the user is the same user that made an examination request using the cellular phone before. If they do not match, the user is prompted to enter the personal identification number a predetermined number of times (S47) and, if they do not match within the predetermined number of times, an error message is displayed and the further execution of the purchase procedure is rejected (S53). If they do not match successively a predetermined number of times, the electronic credit card information (downloaded information) in the flash memory may be discarded.

If a match is found in the personal identification number, the message indicating that the purchase procedure is completed is displayed as shown on the screen in FIG. 5(c) and, at the same time, access is made to the settlement server automatically (S48). Instead of automatically accessing the settlement server, URL link information may be included in the confirmation mail or the product purchase slip to wait for an instruction from the user to move to a linked-to address so that, upon receiving the instruction from the user, access may be made to the settlement server.

Then, mutual authentication is performed between the cellular phone 100 and the settlement server 220 (S49). In this case, the user's digital certificate is used as described above. If the mutual authentication is passable (S50), the cellular phone 100 automatically sends the member information on the user to the settlement server (S51) in the SSL session with no concern to the user. This member information is sent to the authorization gateway 241 for use in authorizing the settlement. If the settlement is authorized, the confirmation message such as the one shown in FIG. 5(d) is displayed on the cellular phone (S52).

The features of the embodiment are summarized as follows:

(1) The personal identification number (PIN) allows the cellular phone to confirm that the current user is its authentic user. This prevents some other person from making an electronic settlement even when the cellular phone is stolen or lost. In addition, the personal identification number is checked locally on the cellular phone. Therefore, there is no danger that personal identification number is leaked during communication that is made when the user purchases products. Furthermore, as compared with making an inquiry about the personal identification number via communication, the time required to inquire about the personal identification number is reduced. Although the personal identification number is stored in the cellular phone, the user cannot directly access its internal storage device and therefore the possibility that the personal identification number is illegally read is decreased.

(2) The use of SSL (for example, 128 bits) makes it possible to mutually authenticate the communication parties with the use of digital certificates and to encrypt communication messages. This prevents pretenders and communication message alterations and, as a result, makes electronic commerce secure. Another advantage with the use of the SSL-compliant browser is that the embodiment may be applied easily to an information home electric appliance with a small memory size.

(3) Because, at the same time the information such as the digital certificate is sent, the member information is sent from the card issuer to the cellular phone in a session in which the user is guaranteed to be a authentic card member with authorization to make an electronic settlement, the member information is secure. At the same time, the member information items required by the card issuer may be stored in the cellular phone in any required format. Therefore, the member information is stored in the way the card issuer intends. For example, the card number or the expiration date included in the member information sent from the web server of the card issuer may be a second card number and/or expiration date for electronic settlement that is different from that recorded on the actual credit card owned by the user. In addition, the fact that the member information is stored in the way the card issuer intends is advantageous for data checking during authorization processing performed by the authorization gateway 241. Because the user cannot directly access the storage device in the cellular phone, it is less likely, as with the personal identification number described above, that the member information is illegally read. In addition, the member information is sent automatically to the settlement server with no need for the user to input member information at use time and with no concern to the user.

Although some preferable embodiments of the present invention have been described above, it is to be understood that various modifications and changes may be made within the scope of the claims. For example, although SSL is used as the encryption communication protocol, other similar encryption communication protocols, such as S-HTTP, may also be used.

"Products" in the present invention include not only visible products but also invisible products such as software. A software product may be downloaded from the Internet after settlement. In addition, although initial user registration and product purchase over the Internet have been described, initial user registration and/or product purchase may be made via TV data broadcasting over a satellite or ground waves or via bi-directional data communication using other communication media such as a cable TV. For example, screen data on initial user registration may be delivered via broadcasting. URL data on a card issuer site may also be delivered via broadcasting.

INDUSTRIAL APPLICABILITY

The present invention may be applied to an information home electric appliance such as a cellular phone, TV set, video game machine, word processor, car navigator, etc. to the design and manufacturing of related computer programs, and relatively secure electronic commerce via credit cards over the Internet.

The invention claimed is:

1. An information home electric appliance for electronic account settlement of products purchased via a credit card at a virtual store on a communication medium, said information home electric appliance having an Internet accessing capability, comprising:

storing means storing a browser for browsing documents described in a markup language;

a browser stored in said storing means, said browser being compliant with an encryption communication protocol; and input means for causing a user to input characters, wherein said browser comprises:

first and second computer readable codes for registering an initial user registration for shopping at a virtual store by a card member who is the user of the information home electric appliance, said first computer readable code operating the information home electric appliance to communicate with a card issuer's server, which is compliant with the encryption communication protocol, in response to an instruction from the user to receive web information defining a form from the server and to input with said form to the server a card number, personal information for identifying the card member, and password information for electronic account settlement decided by the card member, said password information also being stored in an area of a non-volatile storage device in said information home electric appliance, said area being accessible by said browser but inaccessible by the user;

said second computer readable code, receiving from the card issuer's server, information for authenticating the card member in accordance with the encryption communication protocol and personal information on the card member and stores the received information into said non-volatile storage device in said information home electric appliance; and third to seventh computer readable codes for purchasing products at the virtual store, said third computer readable code operating the information home electric appliance to communicate with a site of the virtual store in response to an instruction from the user;

said fourth computer readable code requesting the user to input said password information for electronic account settlement and comparing the entered password information with password information stored in said non-volatile storage device to confirm that the user is the card member who requested the initial user registration via said information home electric appliance;

said fifth computer readable code sending order information to a server of the virtual store in response to an instruction from the user;

said sixth computer readable code accessing a settlement server of said card issuer via the Internet in response to an instruction from the server of the virtual store that received the order information; and said seventh computer readable code authenticating the card member with the settlement server using the information for authenticating the card member and then sending the personal information stored in said non-volatile storage device to the settlement server.

2. The information home electric appliance according to claim 1, wherein the information for authenticating the card member includes a private key in a public key cryptosystem and a digital certificate of the card member sent from the card issuer's server and wherein said authentication of the card member with the settlement server is performed using the private key and the digital certificate of the card member.

3. The information home electric appliance according to any one of claim 1, wherein the personal information that said information home electric appliance receives from the card issuer's server includes at least the card number and a card expiration date.

4. The information home electric appliance according to any one of claim 1, wherein said browser further comprises:

a computer readable code that receives secret information from the card issuer's server during the initial user registration; and a computer readable code that causes the user to input said secret information and said password information in response to an instruction from the server before receiving from the card issuer's server the information for authenticating the card member in accordance with the encryption communication protocol and the personal information on the card member.

5. The information home electric appliance according to any one of claim 1, wherein said browser does not initially comprise said first to seventh computer readable codes but comprises an eighth computer readable code that downloads a computer program implementing said first to seventh computer readable codes.

* * * * *